Patented Jan. 16, 1934

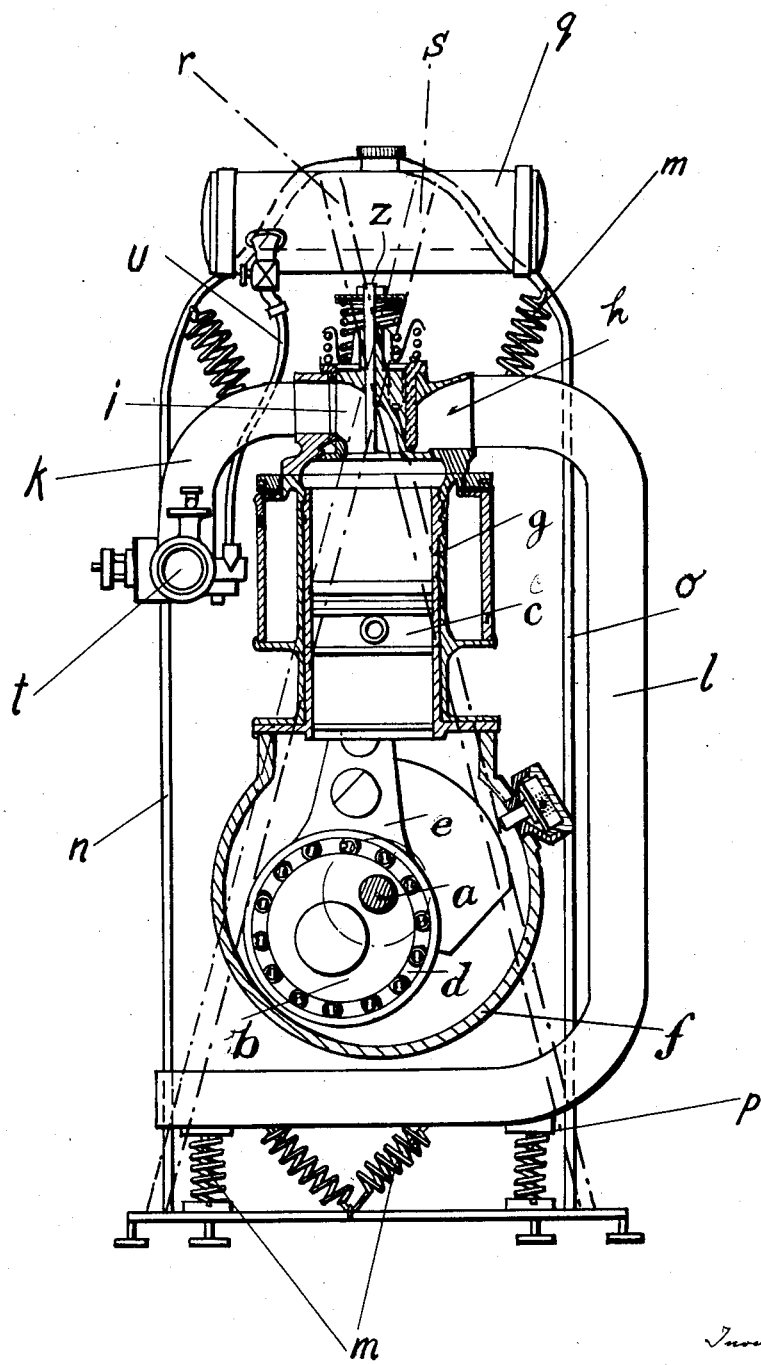

1,944,052

UNITED STATES PATENT OFFICE 1,944,052

PORTABLE POWER PLANT

Engelbert Zaschka, Berlin-Neukolln, Germany, assignor of one-half to Fr. A. Unverdross, doing business as "Dimoha" Hagen-Westf.-Kabel, Haus Busch, Germany Application April 21, 1930. Serial No. 446,155

2 Claims. (Cl. 123—195)

This invention relates to a portable power plant which may be advantageously employed for agricultural work. The power plant is mounted on suitably arranged springs on a frame, which through the medium of a body harness can be carried on the back of a person. In order that the weight of the plant may not be detrimentally affected when working the soil or the like, the engine is constructed in a particular manner. Consequently it has only a one-piece driving mechanism casing which has openings on the cylinder side through which the connecting rod and eccentric can be inserted. Eccentric sheaves are fastened on the driving shaft independently thereof, the eccentric and connecting rod being constructed as a race for a ball bearing in order to conserve weight and space.

An embodiment of the invention is illustrated by way of example in the accompanying drawing which shows a rear elevational view of the engine connected with the frame, the motor being shown in section.

In the casing $f$ mounted on the lower end of a cylinder $g$, a shaft $a$ is journaled. This shaft carries an eccentric sheave $b$ keyed or shrunk on the shaft $a$ and on the outer circumference of this sheave, a ball bearing $d$ is arranged on which one end of the connecting rod $e$ is mounted, the other end of the connecting rod being attached to a piston in the cylinder $g$.

Owing to the fact that no crank pin is required as the end of the connecting rod $e$ directly embraces the sheave, forming the outer race for the ball bearing $d$ having as its inner race the periphery of the sheave $b$, the whole construction is very compact so that the casing $f$ can be very narrow without impairing the efficiency of the engine. The casing is made in one piece and the shaft with the friction rod connected to the sheave are inserted through the aperture over which the cylinder is mounted. Connecting sockets $i$ and $h$ are mounted on the upper end of the cylinder $g$, one on each side of an admission and exhaust valve $z$, to which sockets a suction pipe $k$ and an exhaust pipe $l$ are connected. On the outer end of the suction pipe $k$ a carburetor $t$ is arranged from which a pipe $u$ leads to a fuel tank $q$ mounted at the upper end of the frame $n$—$o$. The suction pipe $k$ is illustrated as of elbow formation, one end thereof, as stated, being in communication with the socket or inlet $i$ to the cylinder $g$, while its other end extends downwardly at one side of the cylinder and to which end the carburetor $t$ is attached.

The exhaust pipe $l$ is of substantially U form with the closed side thereof extending longitudinally of the engine, one end thereof being in communication with the socket or exhaust $h$ of the engine while the other end of the exhaust pipe is disposed below the casing $f$ of the engine.

The engine is resiliently supported within the bars $n$–$o$ of the frame by means of springs $m$ and $p$ interposed between the inlet and exhaust pipes $k$ and $l$ and the frame bars $n$ and $o$. These springs are preferably arranged at the upper end of the frame between adjacent angle portions of the inlet and exhaust pipes and the frame bars and at the lower end of the frame between the lower angle end of the exhaust pipe and adjacent frame bar. The springs resiliently support the engine and absorb the vibrations incident to operation thereof. The engine is supported by the inlet and exhaust pipes on the frame with the springs $n$—$o$ interposed therebetween so that the vibrations of the engine are absorbed by the springs and are not transmitted to the frame bars $n$—$o$. With this means of suspension operating stresses are reduced to a minimum and the engine may be constructed of comparatively light materials.

A body harness consisting of straps $r$ and $s$ are attached to the top and bottom ends of the frame to enable the engine to be carried on the back of a person.

While there is herein shown and described the preferred embodiment of the invention, it is nevertheless to be understood that minor changes may be made therein without departing from the spirit and scope of the invention as claimed.

I claim:—

1. A portable body support for a motor, wherein the motor includes rigid induction and exhaust pipes, said body support comprising frame bars, spring devices extending between the frame bars and the induction and exhaust pipes of the motor for the support of the latter and for absorption of vibration during operation of the motor and body straps carried by the frame bars.

2. A portable body support for a motor, wherein the motor includes rigid induction and exhaust pipes, said body support comprising frame bars, spring devices extending between the frame bars and the induction and exhaust pipes of the motor for the support of the latter and for absorption of vibration during operation of the motor, body straps carried by the frame bars, and a fuel tank supported on the frame bars and having a flexible pipe connection with the motor.

ENGELBERT ZASCHKA.